US012459576B2

(12) United States Patent
Stojkovic et al.

(10) Patent No.: US 12,459,576 B2
(45) Date of Patent: Nov. 4, 2025

(54) VEHICLE STRUCTURAL ASSEMBLY

(71) Applicant: Ford Global Technologies, LLC, Dearborn, MI (US)

(72) Inventors: Dragan B. Stojkovic, Taylor, MI (US); Joseph Antoni, South Lyon, MI (US); Andre Jurkiewicz, Northville, MI (US); Karen Nuler, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 516 days.

(21) Appl. No.: 17/963,349

(22) Filed: Oct. 11, 2022

(65) Prior Publication Data
US 2024/0116572 A1 Apr. 11, 2024

(51) Int. Cl.
B62D 25/08 (2006.01)
B62D 21/12 (2006.01)
B62D 24/00 (2006.01)
B62D 25/04 (2006.01)
B62D 27/02 (2006.01)

(52) U.S. Cl.
CPC ........... B62D 25/082 (2013.01); B62D 21/12 (2013.01); B62D 24/00 (2013.01); B62D 25/04 (2013.01); B62D 25/081 (2013.01); B62D 27/023 (2013.01)

(58) Field of Classification Search
CPC .... B62D 25/08; B62D 25/081; B62D 25/082; B62D 25/04; B62D 25/145; B62D 21/02; B62D 21/12; B62D 27/203

USPC ............. 296/193.09, 203.01, 2, 205, 29, 30
See application file for complete search history.

(56) References Cited

U.S. PATENT DOCUMENTS

| | | | |
|---|---|---|---|
| 6,260,914 B1 * | 7/2001 | Nieminski | B62D 25/14 296/192 |
| 6,357,821 B1 | 3/2002 | Maj et al. | |
| 7,441,819 B2 * | 10/2008 | Azzouz | B62D 21/08 296/203.02 |
| 9,333,989 B2 * | 5/2016 | Donabedian | B62D 25/04 |
| 9,540,047 B2 * | 1/2017 | Min | B62D 25/14 |
| 9,840,284 B2 * | 12/2017 | Kang | B62D 65/06 |
| 10,179,610 B2 * | 1/2019 | Nakamura | B62D 25/088 |
| 10,421,495 B2 * | 9/2019 | DeVoe | B60Q 1/0491 |
| 2003/0107241 A1 | 6/2003 | Ritchie et al. | |
| 2020/0031405 A1 | 1/2020 | Perlo et al. | |

* cited by examiner

Primary Examiner — Dennis H Pedder
(74) Attorney, Agent, or Firm — Burris Law, PLLC

(57) ABSTRACT

A structural assembly of a vehicle includes a pair of hinge pillars, a pair of channel members and a pair of rails. Each channel member of the pair of channel members includes a vertical wall, a top wall, and a bottom wall. The vertical wall is secured to a respective hinge pillar of the pair of hinge pillars and the bottom wall is spaced apart from and below the top wall to define a cavity therebetween. A longitudinal portion of each rail of the pair of rails is secured to a respective channel member of the pair of channel members and at least partially received in the cavity. The longitudinal portion of the rail extends along a longitudinal direction of the vehicle above a respective wheel well of the vehicle.

20 Claims, 7 Drawing Sheets

VEHICLE STRUCTURAL ASSEMBLY

FIELD

The present disclosure relates to a structural assembly for a vehicle and a vehicle having a structural assembly.

BACKGROUND

The statements in this section merely provide background information related to the present disclosure and may not constitute prior art.

In some vehicles, the front subframe includes a pair upper tubes that are connected by a lower support tie bar to generally dictate the lateral sides and forward extent of the space under the hood, also referred to as the engine compartment or the frunk, for example. In some vehicles, the lower support tie bar is secured to the left and right upper tubes after installation of vehicle components (e.g., electric modules) within the space under the hood. However, securing the lower support tie bar to the left and right upper tubes after installation of these vehicle components may cause issues with geometric constraints of the front subframe.

The teachings of the present disclosure address these and other issues with typical front subframes of vehicles.

SUMMARY

This section provides a general summary of the disclosure and is not a comprehensive disclosure of its full scope or all of its features.

In one form, the present disclosure provides a structural assembly for a vehicle that includes left and right hinge pillars, left and right channel members, and left and right upper rails. The left channel member includes a left vertical wall, a left top wall, and a left bottom wall. The left vertical wall is secured to the left hinge pillar. The left top wall and the left bottom wall extend outboard from the left vertical wall. The left bottom wall is spaced apart from and below the left top wall to define a left cavity therebetween. The right vertical wall is secured to the right hinge pillar. The right top wall and the right bottom wall extend outboard from the right vertical wall. The right bottom wall is spaced apart from and below the right top wall to define a right cavity therebetween. A longitudinal portion of the left upper rail is secured to the left channel member and is at least partially received in the left cavity. The longitudinal portion of the left upper rail extends along a longitudinal direction of the vehicle above a left wheel well of the vehicle. A longitudinal portion of the right upper rail is secured to the right channel member and is at least partially received in the right cavity. The longitudinal portion of the right upper rail extends along the longitudinal direction of the vehicle above a right wheel well of the vehicle.

In variations of the structural assembly of the above paragraph, which may be implemented individually or in combination: the left upper rail and the right upper rail are tubular members; a cross beam extends in a transverse direction relative to the longitudinal direction of the vehicle, the cross beam being secured to the left and right upper rails forward of the left and right wheel wells; the cross beam is a tubular member; a cowl panel extends in a transverse direction relative to the longitudinal direction of the vehicle, the left channel member is secured to the cowl panel and the right channel member is secured to the cowl panel; the left upper rail is welded to the left top wall and the left bottom wall to inhibit movement of the left upper rail relative to the left channel member and the right upper rail is welded to the right top wall and the right bottom wall to inhibit movement of the right upper rail relative to the right channel member; the left vertical wall defines a plurality of access holes formed therethrough and the right vertical wall defines a plurality of access holes formed therethrough; the left upper rail is mechanically fastened to the left top wall and the left bottom wall to inhibit movement of the left upper rail relative to the left channel member and the right upper rail is mechanically fastened to the right top wall and the right bottom wall to inhibit movement of the right upper rail relative to the right channel member; the left upper rail defines a plurality of access holes formed therein and the right upper rail defines a plurality of access holes formed therein; each channel member of the pair of channel members has a substantially U-shape; the left upper rail and the right upper rail each include: a riser portion extending in a vertical direction of the vehicle and a transition portion extending inwardly from the longitudinal portion to the riser portion; and a cross beam extends in a transverse direction relative to the longitudinal direction of the vehicle and is secured to the riser portions of the left and right upper rails.

In another form, the present disclosure provides a structural assembly for a vehicle that includes a vehicle body, a pair of channel members and a front subframe. The vehicle body has a pair of hinge pillars. Each channel member is secured to a respective hinge pillar of a vehicle body and defines a cavity. The front subframe includes a pair of rails. Each rail of the pair of rails extends above a portion of a respective wheel well and includes a first end portion that extends along a longitudinal direction of the vehicle and a second end portion that extends in a vertical direction of the vehicle. The first end portions of the pair of rails have a first distance between each other and the second end portions of the pair of rails have a second distance between each other that is less than the first distance. The first end portion of each rail is secured to a respective channel member and is at least partially received in the cavity of the respective channel member.

In yet another form, the present disclosure provides a method for securing a front subframe to a vehicle body of a vehicle. The method includes securing a pair of channel members to respective hinge pillars of the vehicle body, securing a pair of rails of the front subframe to respective channel members of the pair of channel members, assembling one or more electrical modules at a front end of the vehicle, and securing a cross beam to the pair of rails of the front subframe after one or more electrical modules have been assembled to the front end of the vehicle. The cross beam extends in a transverse direction relative to a longitudinal direction of the vehicle.

In a variation of the method of the above paragraph, the electrical modules includes at least one of an electronic brake booster, a continuously variable transmission, and a power distribution box.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
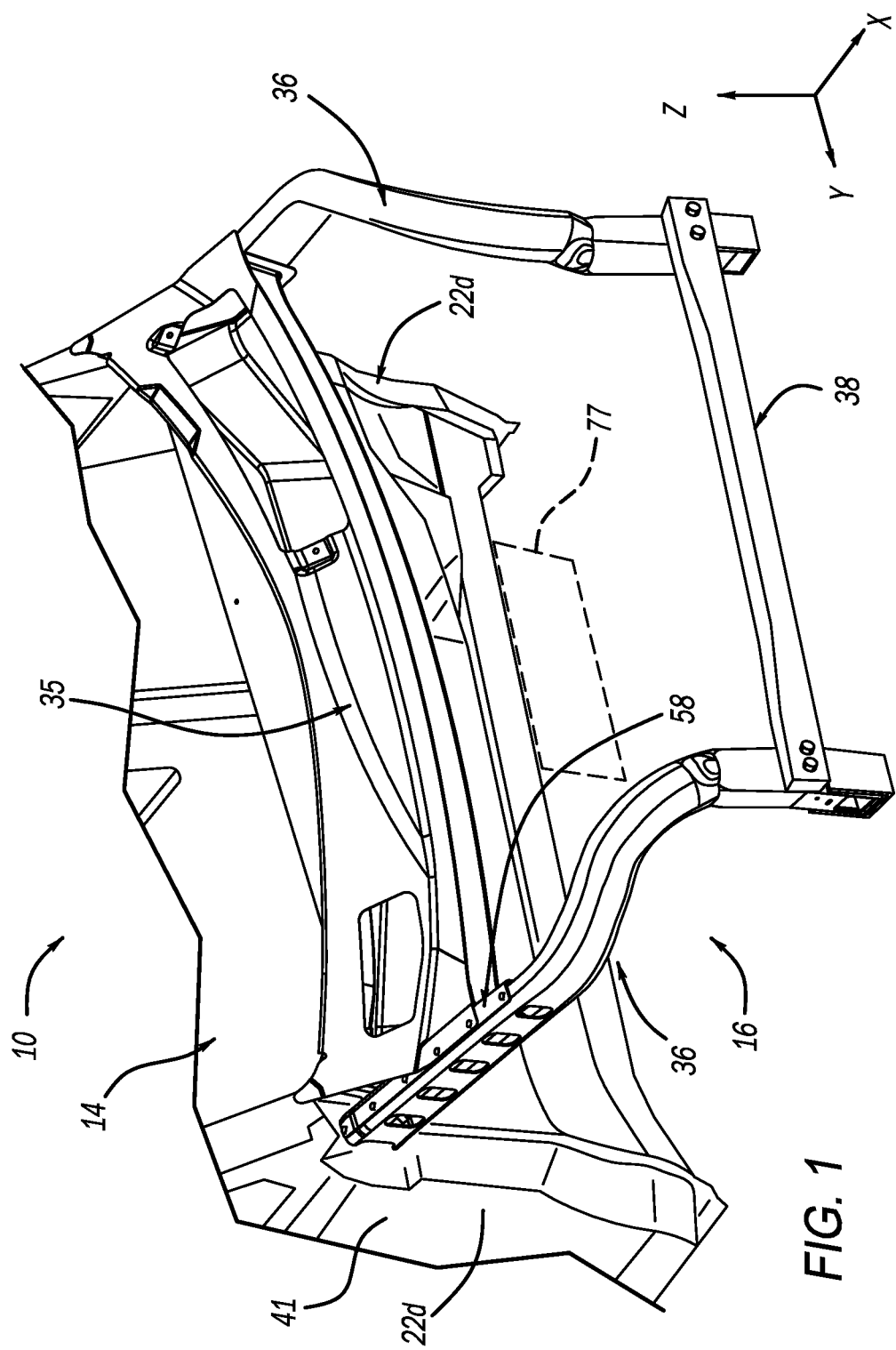
FIG. 1 is a perspective view of a portion of vehicle including a structural assembly according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
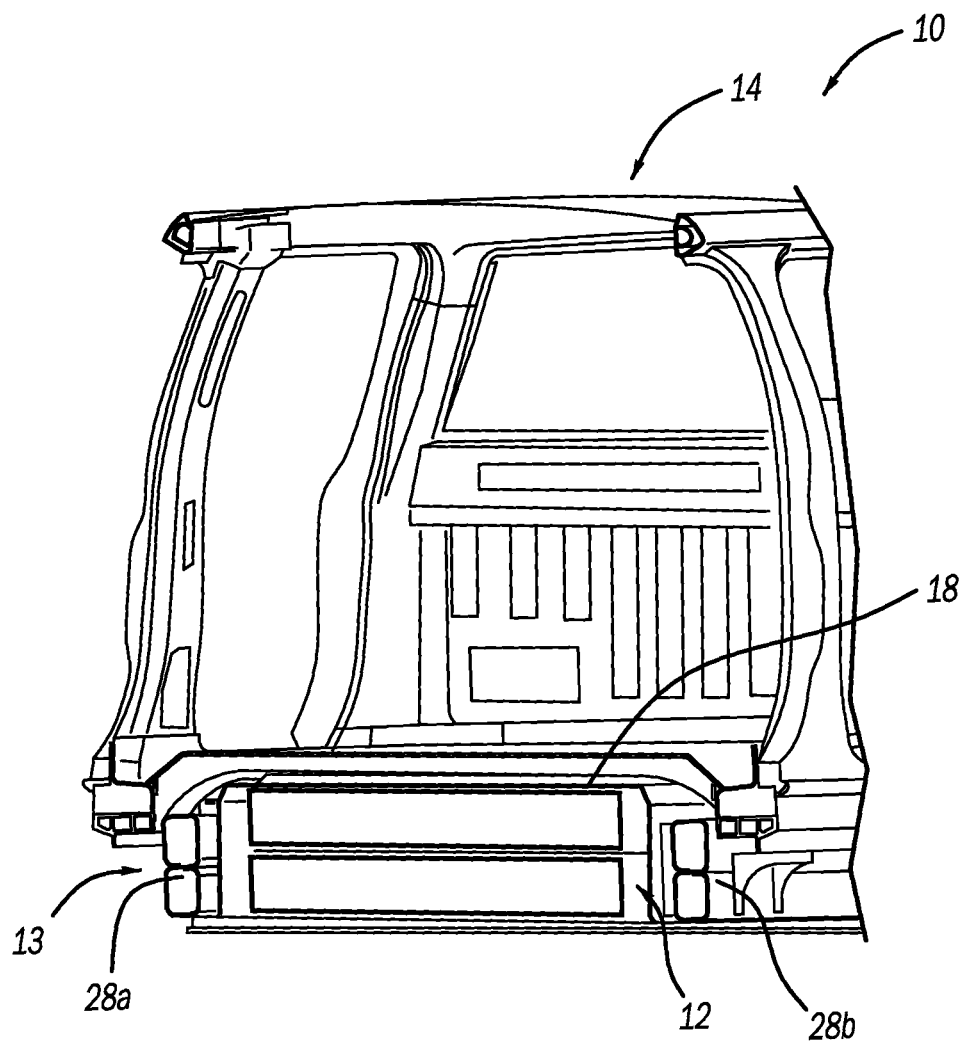
FIG. 2 is a cross-sectional perspective view of a portion of the vehicle of FIG. 1.

With reference to FIGS. 1 and 2, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. In still other examples, the vehicle may be an internal combustion engine driven vehicle. In the example provided, the vehicle 10 is a body-on-frame type of vehicle, though other types of vehicle architecture can be used, such as uni-body for example.

In the example provided, the vehicle 10 includes a battery pack 12 (FIG. 2), a vehicle frame 13 (FIG. 2), a vehicle body 14, and a front-end structural assembly 16 (also referred to herein as a subframe). The battery pack 12 may be disposed at various locations of the vehicle 10 and may be mounted to the vehicle frame 13 and/or the vehicle body 14. In this way, the battery pack 12 is supported by the vehicle frame 13 and/or the vehicle body 14 and is remote from a passenger cabin (not shown) and cargo compartments (not shown) of the vehicle 10, therefore, not occupying space that would otherwise be available for passengers or cargo. The battery pack 12 powers a rear motor (not shown) to drive a set of rear wheels (not shown) and/or powers a front motor (not shown) to drive a set of front wheels (not shown).

The battery pack 12 is secured to and supported by longitudinal rails 28a, 28b of the vehicle frame 13 and includes a battery housing 18 and one or more battery arrays. The battery housing 18 is an enclosure which provides a structural surrounding and sealed compartment for the battery arrays and other battery components such as cooling lines, support brackets, and wiring disposed therein. The battery arrays are disposed within the battery housing 18. The battery arrays may be rechargeable and may include lithium-ion batteries or any other suitable electrical power storage units. The battery pack 12 is located below the vehicle body 14 and the vehicle body 14 is supported on the vehicle frame 13.

Figure 3:
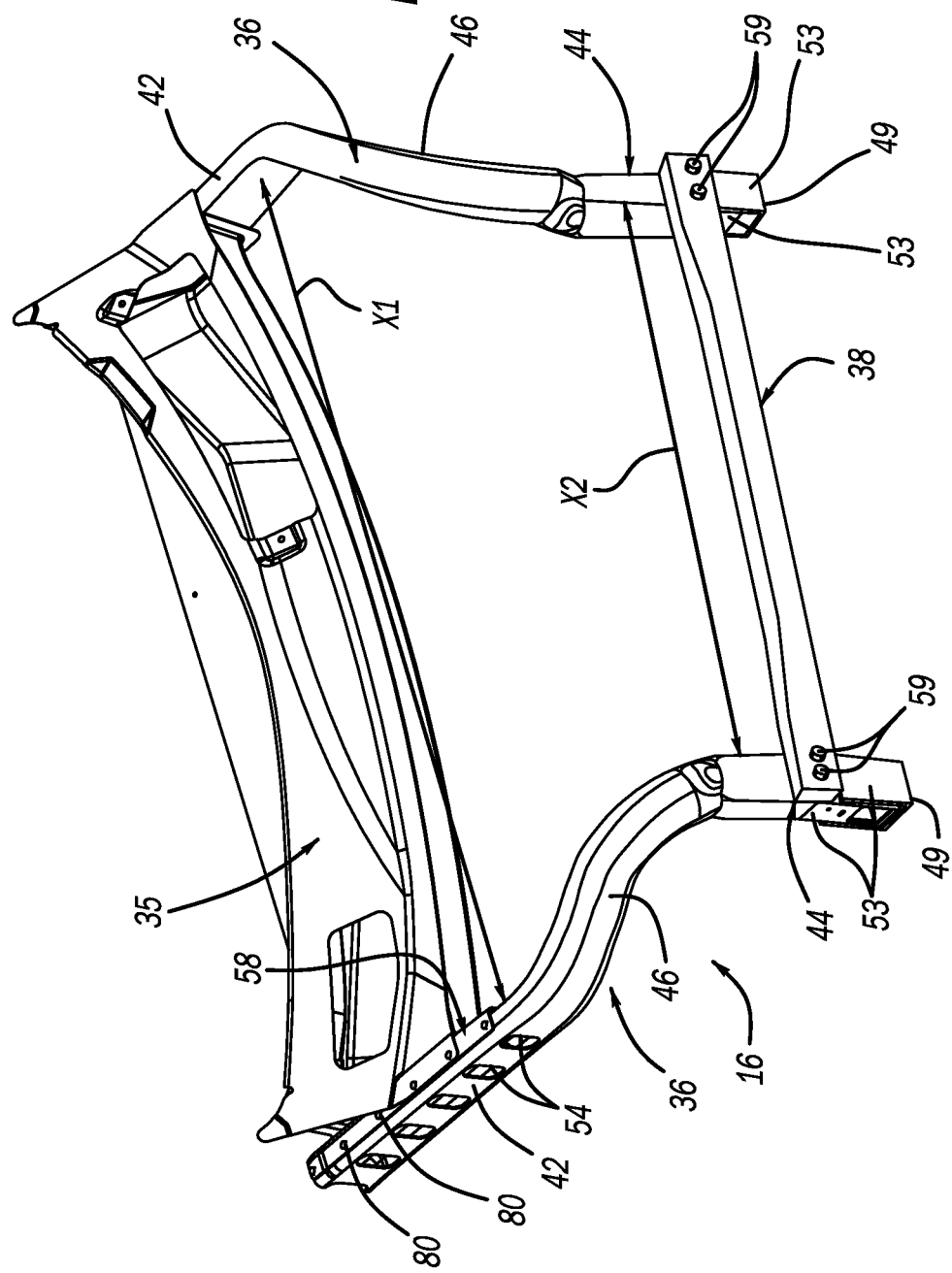
FIG. 3 is a perspective view of the structural assembly of the vehicle of FIG. 1.

With additional reference to FIG. 3, the front-end structural assembly 16 is a supporting structure of vehicle components and panels and includes, inter alia, a pair of opposed upper tubes or rails 36 and a cross beam 38. A cowl panel 35 spans a width of the vehicle 10 (i.e., extends in a transverse direction relative to a longitudinal direction of the vehicle 10) and is secured to the upper tubes 36 of the front-end structural assembly 16. The cowl panel 35 partially supports a vehicle windshield (not shown) and dashboard (not shown). The cowl panel 35 also covers the space between the vehicle hood panel (not shown) and the vehicle windshield (not shown), thereby protecting unwanted debris and fluids from entering into vehicle systems such as the windshield wiper system, for example.

Figure 4:
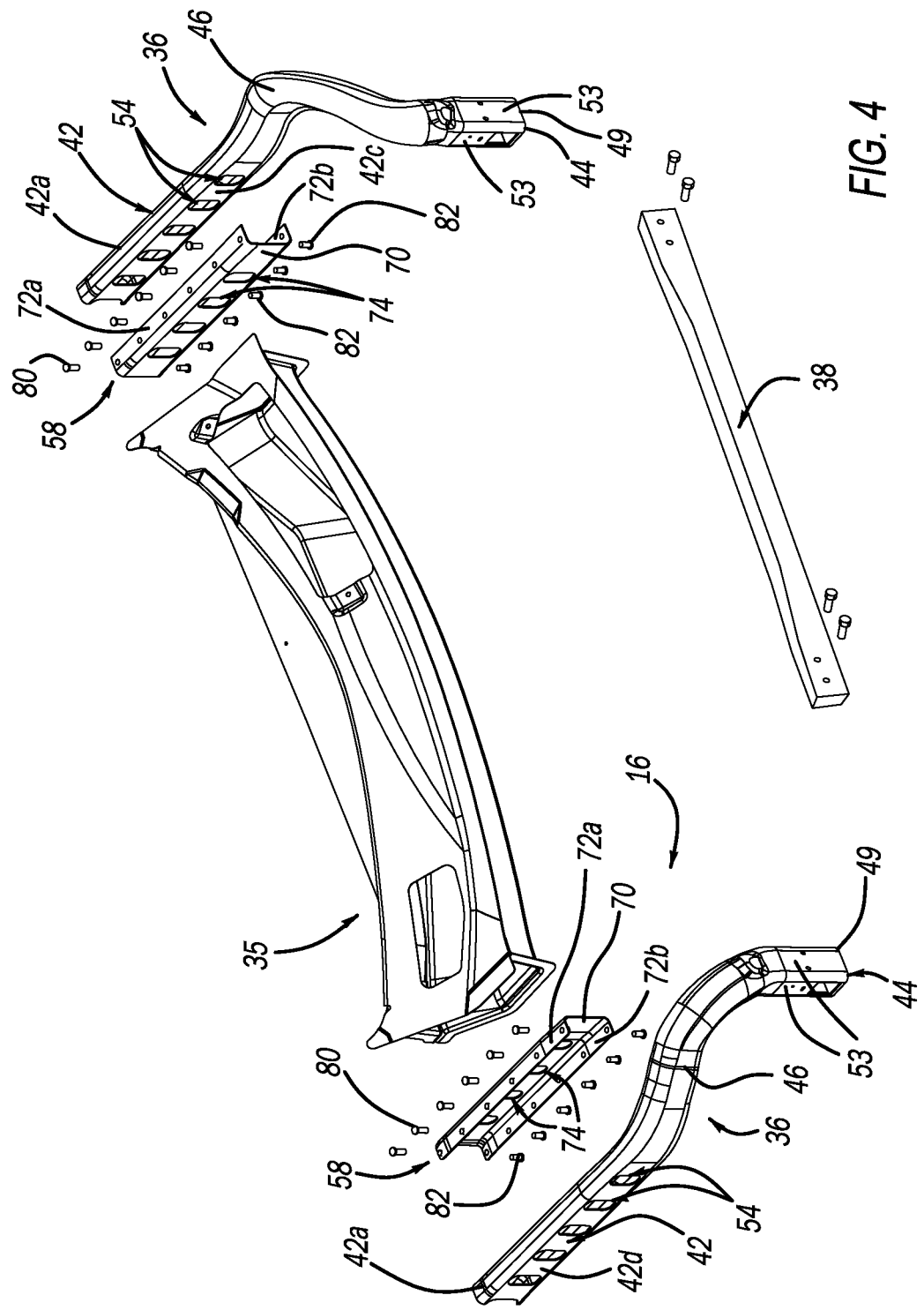
FIG. 4 is an exploded perspective view of the structural assembly of the vehicle of FIG. 1.
Figure 5:
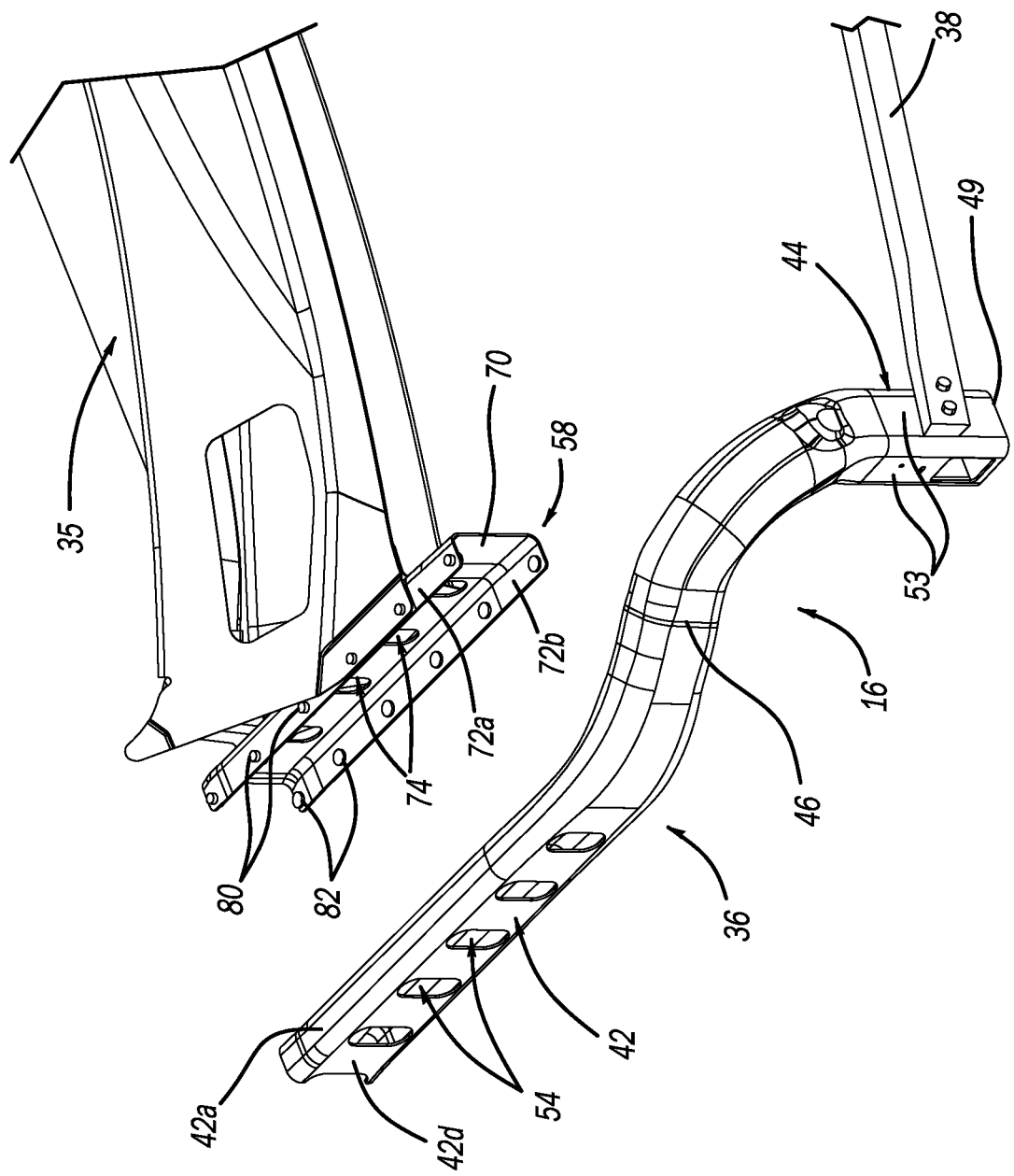
FIG. 5 is a perspective view of a portion of the structural assembly secured to the vehicle of FIG. 1, illustrated with a rail of the structural assembly exploded from a channel member of the structural assembly.

The upper tubes 36 extend from an upper portion 41 of a respective hinge pillar 22d to the cross beam 38 (FIG. 1). The upper tubes 36 are located above a respective front wheel well and extend along the longitudinal direction of the vehicle 10. With reference to FIGS. 3-5, each upper tube 36 includes a channel portion or longitudinal portion 42, a riser portion 44, and a transition portion 46. The channel portion 42 is secured to a respective channel member 58 of the structural assembly 16 and extends along the longitudinal direction of the vehicle 10.

Figure 6:
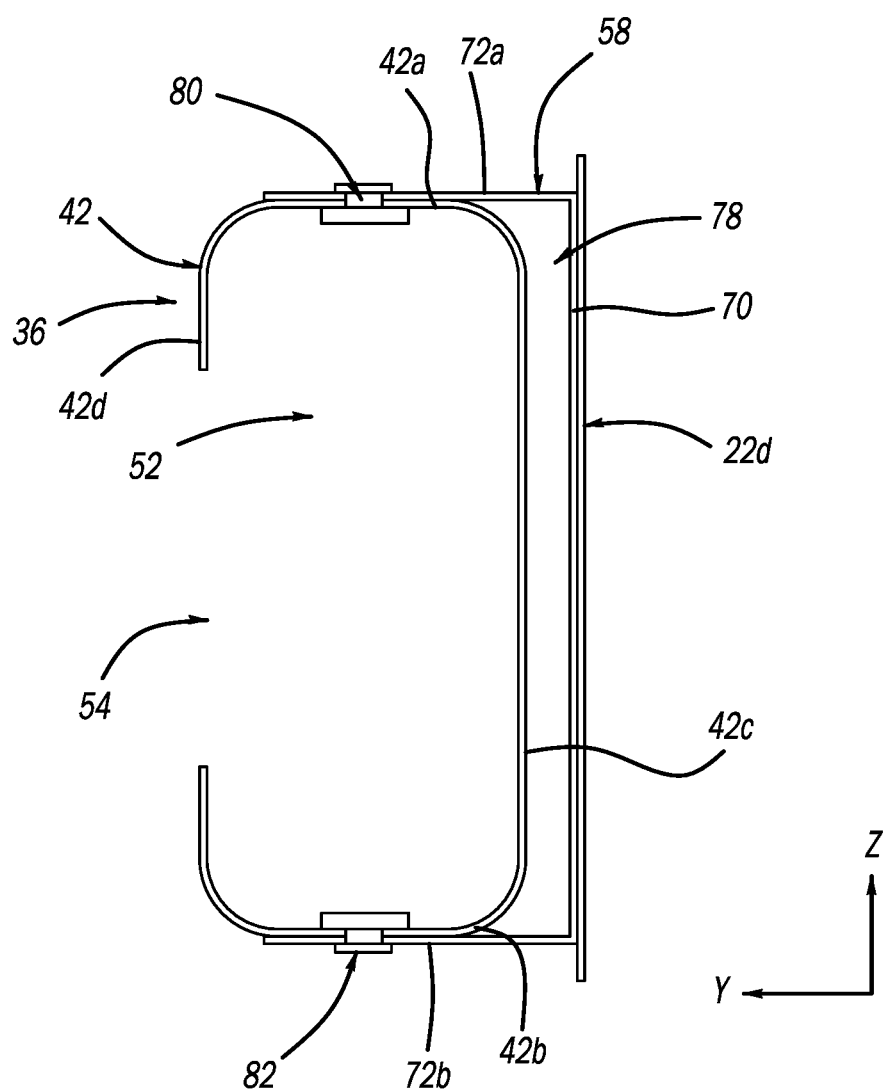
FIG. 6 is a cross-sectional view of a portion of the structural assembly of the vehicle of FIG. 1.

As best shown in FIG. 6, the channel portion 42 includes an upper wall 42a, a bottom wall 42b, an inboard side wall 42c and an outboard side wall 42d that cooperate with each other to define a cavity 52. With reference to FIGS. 4-6, each of the inboard side wall 42c and the outboard side wall 42d includes a plurality of apertures 54 that act as access opening to the cavity 52. In the example illustrated, the apertures 54 have an oval shape. In some forms, the apertures 54 may have a rectangular shape, a circular shape, or any other suitable shape that provides access to the cavity 52. The channel portion 42 also has a generally rectangular-shaped cross section and may optionally have rounded corners connecting adjacent walls 42a, 42b, 42c, 42d.

The riser portion 44 is located at a front end of the vehicle 10 and acts as a mounting location for the cross beam 38. Stated differently, the riser portion 44 is located further forward of the vehicle 10 relative to the channel portion 42 and the transition portion 46. The riser portion 44 extends in a vertical direction of the vehicle 10 and has a lower end 49 that is located below the channel portion 42 and the transition portion 46 of the upper tube 36. In the example illustrated, the riser portion 44 has a plurality of flat walls 53 that cooperate with each other to define a square or rectangular shape cross-section, though other configurations may be used.

The transition portion 46 extends inwardly from the channel portion 42 to the riser portion 44 and may also extend at an angle inwardly and downward to the riser portion 44. In this way, the channel portions 42 of the upper tubes 36 have a distance X1 between each other and the riser portions 44 of the upper tubes 36 have a distance X2 between each other that is less than the distance X1. Stated differently, the riser portions 44 of the upper tubes 36 are closer toward each other than the channel portions 42 of the upper tubes 36. The transition portion 46 may have a circular shape, a rectangular shape, or may be constructed of a combination of shapes (e.g., a first section of the transition portion 46 may have a rectangular shape and a second section of the transition portion 46 may have a circular shape).

The cross beam 38 extends in a transverse direction relative to the longitudinal direction of the vehicle 10 and is secured to the riser portion 44 of the pair of upper tubes 36.

In this way, the cross beam 38 connects the upper tubes 36 to each other. That is, in the example illustrated, opposing ends of the cross beam 38 are secured to walls 53 of the riser portion 44 by mechanical fasteners 59 (FIG. 3). In some forms, the cross beam 38 may be a tubular member.

While not specifically illustrated, the longitudinal rails 28a, 28b may extend forward and be connected to the cross beam 38 or the riser portions 44.

The structural assembly 16 includes the pair of channel members 58. Each channel member 58 extends along the longitudinal direction of the vehicle 10 and is made of a metal material, for example. Each channel member 58 is fixed to a respective hinge pillar 22d and a respective side of the cowl panel 35. In this way, each channel member 58 is set in a predetermined position along the X-axis of the vehicle 10 and the Z-axis of the vehicle 10. Each channel member 58 is also rotationally fixed in a predetermined position along the Y-axis of the vehicle 10.

With reference to FIGS. 4-6, each channel member 58 has a generally U-shape and includes a vertical wall 70 and a pair of flanges 72a, 72b extending outboard from respective ends of the vertical wall 70. The vertical wall 70 is fixed to the respective hinge pillar 22d. In the example illustrated, the vertical wall 70 is welded to the respective hinge pillar 22d. In some forms, the vertical wall 70 is fixed to the respective hinge pillar 22d by an adhesive or by a plurality of mechanical fasteners. The vertical wall 70 includes a plurality of apertures 74 (FIGS. 4 and 5) formed therein. In the example illustrated, the plurality of apertures 74 are aligned with each other along a length of the vertical wall 70 and have an oblong shape. In some forms, the apertures 74 may be offset from each other and/or have a rectangular shape, a circular shape, and/or any other suitable shape that allows for tuning of the channel member 58 to meet impact requirements of the vehicle 10.

The flange or upper wall 72a extends outboard from an upper end of the vertical wall 70 and the flange or lower wall 72b extends outboard from a lower end of the vertical wall 70. In this way, the vertical wall 70 and the flanges 72a, 72b cooperate with each other to define a cavity 78 (FIG. 6) that receives the channel portion 42 of the upper tube 36. The flange 72a is also fixed to the respective side of the cowl panel 35. The channel portion 42 is disposed within the cavity 78 and secured to the channel member 58 to set the upper tube 36 in a predetermined position along the X-axis of the vehicle 10 and the Y-axis of the vehicle 10. Each upper tube 36 is also rotationally fixed in a predetermined position along the X-axis of the vehicle 10.

In the example illustrated, fasteners 80 extend through the flange 72a and through the upper wall 42a of the channel portion 42 and fasteners 82 extend through the flange 72b and through the bottom wall 42b of the channel portion 42. In this way, the upper tube 36 is set in the predetermined position along the X-axis of the vehicle 10 and the Y-axis of the vehicle 10 and is rotationally fixed in the predetermined position along the X-axis of the vehicle 10. The fasteners 80 extend through the flange 72a and through the upper wall 42a and the fasteners 82 extend through the flange 72b and through the bottom wall 42b. In some forms, the flange 72a is welded to the upper wall 42a of the channel portion 42 and the flange 72b is welded to the bottom wall 42b of the channel portion 42, thereby setting the upper tube 36 in the predetermined position along the X-axis of the vehicle 10 and the Y-axis of the vehicle 10, and rotationally fixing the upper tube 36 in the predetermined position along the X-axis of the vehicle 10. In other words, the channel portion 42 is received in the cavity 78 in a manner that permits the channel portion 42 to move relative to the channel member 58 to fine tune the positioning of the channel portion 42 relative to the hinge pillar 22d before being secured by the fasteners 80 and 82, welding, or other fastening methods. The apertures 54 in the outboard side wall 42d of the channel portion 42 act as access points to allow the fasteners 80, 82 to secure the upper tube 36 to the channel member 58.

Figure 7:
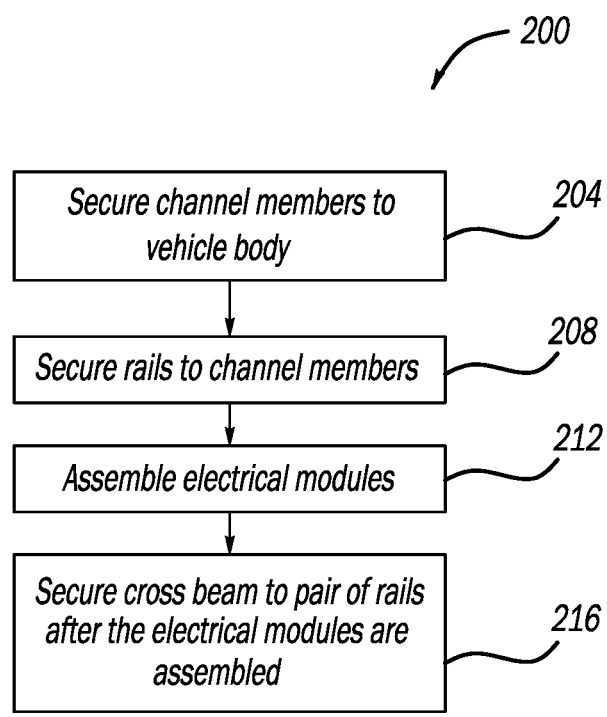
FIG. 7 is a flowchart illustrating a method for securing a front-end structure to a vehicle body of a vehicle, according to the principles of the present disclosure.

With reference to FIG. 7, a method 200 for securing the front-end structural assembly 16 to the vehicle body 14 of the vehicle 10 will be described in greater detail. It should be understood that the vehicle 10 may be raised off of a ground surface (not shown) by a vehicle hoist (not shown) for one or more of the assembling steps described below. First, at step 204, the pair of channel members 58 are secured to the respective hinge pillars 22d of the vehicle body 14 as described above. At this step 204, the channel members 58 may also optionally be secured to the cowl 35. Next, at step 208, the pair of upper tubes 36 are secured to respective channel members 58 as described above. Next, at step 212, the electrical modules 77 are assembled to the front end of the vehicle 10. The electrical modules may include one or more of an electronic brake booster (EBB), a continuously variable transmission (CVT), and a power distribution box (PDB), for example. Next, at step 216, the cross beam 38 is secured to the pair of upper tubes 36 as described above. It should be understood that the cross beam 38 is secured to the pair of upper tubes 36 after the electrical modules have been assembled to the front end of the vehicle 10. In this way, the operator does not have to constantly go under the cross beam 38 as the operator is assembling the electrical modules to the front end of the vehicle 10.

The channel members 58 of the present disclosure sets the upper tubes 36 of the front-end structural assembly in a predetermined position without the cross beam 38 being secured to the upper tubes 36. In this way, the electrical modules can be assembled to the front end of the vehicle 10 without the operator needing to constantly go under the cross beam 38 and without the concern of the upper tubes 36 moving out of position as the electrical modules are assembled to the front end of the vehicle 10. The apertures 74 of the channel members 58 also provides the advantage of tuning of the channel members 58 to meet side impact requirements of the vehicle 10.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly of a vehicle comprising:
   a left hinge pillar and a right hinge pillar;
   a left channel member and a right channel member, wherein the left channel member includes a left vertical wall, a left top wall, and a left bottom wall, wherein the left vertical wall is secured to the left hinge pillar, wherein the left top wall and the left bottom wall extend outboard from the left vertical wall, the left bottom wall being spaced apart from and below the left top wall to define a left cavity therebetween, the right channel member includes a right vertical wall, a right top wall, and a right bottom wall, wherein the right vertical wall is secured to the right hinge pillar, wherein the right top wall and the right bottom wall extend outboard from the right vertical wall, the right bottom wall being spaced apart from and below the right top wall to define a right cavity therebetween; and a left upper rail and a right upper rail, wherein a longitudinal portion of the left upper rail is secured to the left channel member and at least partially received in the left cavity, the longitudinal portion of the left upper rail extending from a rear end of the left channel member toward a front end of the left channel member along a longitudinal direction of the vehicle above a left wheel well of the vehicle, wherein a longitudinal portion of the right upper rail is secured to the right channel member and at least partially received in the right cavity, the longitudinal portion of the right upper rail extending from a rear end of the right channel member toward a front end of the right channel member along the longitudinal direction of the vehicle above a right wheel well of the vehicle.

2. The structural assembly of claim 1, wherein the left upper rail and the right upper rail are tubular members.

3. The structural assembly of claim 1, further comprising a cross beam extending in a transverse direction relative to the longitudinal direction of the vehicle, the cross beam being secured to the left and right upper rails forward of the left and right wheel wells.

4. The structural assembly of claim 3, wherein the cross beam is a tubular member.

5. The structural assembly of claim 1, further comprising a cowl panel extending in a transverse direction relative to the longitudinal direction of the vehicle, and wherein the left channel member is secured to the cowl panel and the right channel member is secured to the cowl panel.

6. The structural assembly of claim 1, wherein the left upper rail is welded to the left top wall and the left bottom wall to inhibit movement of the left upper rail relative to the left channel member and the right upper rail is welded to the right top wall and the right bottom wall to inhibit movement of the right upper rail relative to the right channel member.

7. The structural assembly of claim 1, wherein the left vertical wall defines a plurality of access holes formed therethrough and the right vertical wall defines a plurality of access holes formed therethrough.

8. The structural assembly of claim 1, wherein the left upper rail is mechanically fastened to the left top wall and the left bottom wall to inhibit movement of the left upper rail relative to the left channel member and the right upper rail is mechanically fastened to the right top wall and the right bottom wall to inhibit movement of the right upper rail relative to the right channel member.

9. The structural assembly of claim 1, wherein the left upper rail defines a plurality of access holes formed therein and the right upper rail defines a plurality of access holes formed therein.

10. The structural assembly of claim 1, wherein each of the right and left channel members has a substantially U-shape.

11. The structural assembly of claim 1, wherein the left upper rail and the right upper rail each include:
a riser portion extending in a vertical direction of the vehicle; and
a transition portion extending inwardly from the longitudinal portion to the riser portion.

12. The structural assembly of claim 11, further comprising a cross beam extending in a transverse direction relative to the longitudinal direction of the vehicle and secured to the riser portions of the left and right upper rails.

13. A structural assembly of a vehicle comprising:
a vehicle body having a pair of hinge pillars;
a pair of channel members, each channel member secured to a respective hinge pillar and defining a cavity; and
a front subframe comprising a pair of rails, each rail of the pair of rails extending above a portion of a respective wheel well and comprising a first end portion extending along a longitudinal direction of the vehicle and a second end portion extending in a vertical direction of the vehicle, the first end portions of the pair of rails having a first distance between each other and the second end portions of the pair of rails having a second distance between each other that is less than the first distance,
wherein the first end portion of each rail is secured to a respective channel member and is at least partially received in the cavity of the respective channel member,
wherein the first end portion extends from a rear end of the respective channel member toward a front end of the respective channel member.

14. The structural assembly of claim 13, wherein each channel member of the pair of channel members includes a vertical wall and a pair of flanges extending outwardly from a respective end of the vertical wall.

15. The structural assembly of claim 14, wherein the vertical wall comprises a plurality of access holes formed therein.

16. The structural assembly of claim 14, wherein each rail is mechanically fastened to the pair of flanges of the respective channel member to inhibit movement of the rail along a plurality of axes.

17. The structural assembly of claim 13, wherein each rail of the pair of rails comprises a plurality of access holes formed therein.

18. The structural assembly of claim 13, wherein the front subframe further comprises a cross beam extending in a transverse direction relative to the longitudinal direction of the vehicle and secured to the second end portions of the pair of rails.

19. A method for securing a front subframe to a vehicle body of a vehicle, the method comprising:
securing a pair of channel members to respective hinge pillars of the vehicle body;
securing a pair of rails of the front subframe to respective channel members of the pair of channel members, each rail extending above a portion of a respective wheel well and including a longitudinal portion that extends from a rear end of the respective channel member toward a front end of the respective channel member;
assembling one or more electrical modules to a front end of the vehicle between the pair of rails; and
securing a cross beam to the pair of rails of the front subframe after the one or more electrical modules have been assembled to the front end of the vehicle, the cross beam extending in a transverse direction relative to a longitudinal direction of the vehicle.

20. The method of claim 19, wherein the one or more electrical modules includes at least one of an electronic brake booster, a continuously variable transmission, and a power distribution box.

\* \* \* \* \*